May 27, 1952 O. H. SCHADE 2,598,134

POWER CONSERVATION SYSTEM

Filed May 11, 1945 3 Sheets-Sheet 1

INVENTOR
OTTO H. SCHADE
BY H. G. Grover.
ATTORNEY

May 27, 1952 O. H. SCHADE 2,598,134

POWER CONSERVATION SYSTEM

Filed May 11, 1945 3 Sheets-Sheet 2

INVENTOR
OTTO H. SCHADE
BY H. S. Grover.
ATTORNEY

INVENTOR
OTTO H. SCHADE
BY
H. S. Grover,
ATTORNEY

UNITED STATES PATENT OFFICE 2,598,134

POWER CONSERVATION SYSTEM

Otto H. Schade, West Caldwell, N. J., assignor to Radio Corporation of America, a corporation of Delaware Application May 11, 1945, Serial No. 593,161

29 Claims. (Cl. 315—27)

The present invention relates to a method and means for reclaiming a portion of the power normally lost in cyclic reactive load circuits, especially those used in television transmitting or receiving systems for causing the electron beam of a cathode-ray tube to be deflected horizontally at a relatively high rate.

In present-day television systems the cathode-ray beam is very frequently deflected by electromagnetic means. This deflection occurs (for a 525 line image raster which is produced at the rate of 30 complete image frames per second) at a rate of 15,750 cycles per second. Usually, nine-tenths or more of the time allotted for each deflection cycle is utilized for scanning purposes, the remaining portion of the cycle being used to return the scanning beam to its initial starting point. Actually, it is desirable, in accordance with the above practice, that the return time for horizontal deflection be even less than $1/157{,}500$th second, if possible.

In order to develop the necessary current change in the deflecting coil to bring about the required change of flux for deflecting the cathode-ray beam in such relatively short periods of time, a relatively high plate supply voltage is required for the power tube, as a large inductive voltage is induced in the deflection coils. This voltage which is represented mathematically as $$L\frac{di}{dt}$$

where L represented the inductance of the coil and $$\frac{di}{dt}$$

is the differential representing the rate of change of current with respect to time, has a constant value for linear deflection, and is the load voltage drop in the plate circuit of the power tube. This power tube, which may be of the beam power type, works in conjunction with either a so-called "damping diode" or a controlled inverter tube which assists in producing the required linear change $$\left(\frac{di}{dt}\right)$$

of current by controlling the dissipation or the discharge rate of the magnetic energy in the deflection coil inductance. Practical circuits of this type are not as efficient as would be desired, however, and considerable power and a relatively high supply voltage are required to produce the desired horizontal movement of the cathode-ray beam, especially in systems employing a camera tube having a low-velocity scanning beam, such as that known as the "Orthicon," or even in a so-called "Kinescope" tube of the projection type.

Although the problem is a serious one for deflection circuits operating at a frequency of 15,750 cycles, it is even more important in high-speed scanning circuits such as used in color television, in which the operating frequency may vary between 20 and 30 kilocycles. In such cases, an even higher supply voltage is required because of the increased voltage drop on the circuit inductance.

The low efficiency of conventional circuits of this type, with their consequent high D.-C. power input requirements, is a principal concern of the present invention. The ideal deflection circuit is one in which no power is consumed. Although a part of the D.-C. power supplied to the scanning system is always lost in practical circuits in the process of being converted into various forms of energy, nevertheless an important fraction (30 to 40%) may be recovered in the form of D.-C. power to be used over again by the power tube. This D.-C. power can be fed back in series with the supply voltage of the power tube, permitting reduction of the supply voltage by an amount determined by the percentage of the recovered power. Furthermore, not only does such a principle effect a better utilization of power by reducing the required supply voltage, but, in addition, it has been found to give unusual stability of deflection linearity over wide ranges of amplitude and operating frequency, and also safeguards the power tube against damage from overloading when operating with reduced input signals.

According to a feature of the present invention as it is applied to a deflection system having a transformer intermediate the power tube and damper tube, there is provided an energy-storage element in the damper tube circuit which is designed to be charged by the energy released therefrom. The energy stored by such element is then applied for the purpose of recirculation in either of two ways: (1) in parallel with the supply source, in which case the voltage developed across the energy-storage element is made to equal the supply voltage, or (2) in series with the supply source, in which case the average plate currents of the power tube and damper tube are made equal. The recovered D.-C. power may be used to reduce the required supply voltage while maintaining the same deflection amplitude, or it may be added to boost the original supply voltage to result in greater scanning power.

One object of the present invention, therefore, is to provide a method and means for reclaiming a portion of the power normally wasted in cyclic reactive load circuits.

Another object of the present invention is to provide an improved cathode-ray beam deflection circuit of the type used in television transmitting or receiving systems.

Still another object of the present invention is the provision of a cathode-ray beam deflecting circuit which provides highly efficient utilization of the input power.

A further object of the present invention is the provision of a cathode-ray beam deflecting circuit in which a portion of the power output may be recovered and used over again by the power tube, thus reducing the required power input.

A still further object of the present invention is the provision of a cathode-ray beam deflecting circuit which is self-adjusting to maintain deflection linearity over a wide range of scanning amplitudes, frequencies, and supply voltage variations.

An additional object of the present invention is to provide a cathode-ray beam deflecting circuit in which the power tube is protected against damage due to overloading through the provision of means for reducing the plate voltage of the power tube as a consequence of a decrease in the input signal.

Other objects and advantages will be apparent from the following description of a preferred form of the invention and from the drawings, in which.

Figure 1:
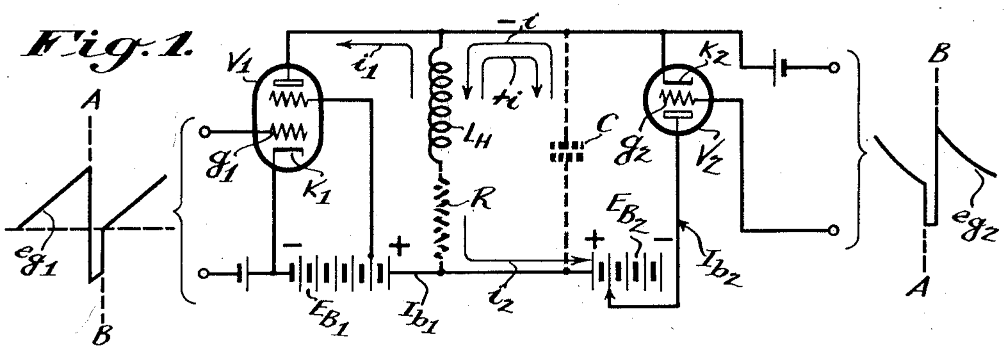
Fig. 1 is a schematic representation of a typical cathode-ray beam deflecting circuit.

The energy conversion cycle of a typical scanning system will be described in connection with Figs. 1 and 2 of the drawings. The circuit shown in Fig. 1 includes a power tube $V_1$, in the anode-cathode circuit of which is a battery or other source of potential $E_{B1}$ connected with the polarity shown. Also in the anode-cathode circuit of power tube $V_1$, and in series with battery $E_{B1}$, is an inductance $L_H$ having resistance R and distributed capacity C. The inductance $L_H$ represents, for the purpose of illustration, the usual horizontal deflection coils of a cathode-ray tube yoke assembly. Between the cathode $k_1$ and control electrode $g_1$ of power tube $V_1$ a control voltage variation of waveform $e_{g1}$ is applied.

Across the inductance $L_H$ with its resistance R is connected a rectifier or inverse power control tube $V_2$ in series with a second battery or other source of potential $E_{B2}$. The cathode $k_2$ of the inverse power control tube $V_2$ is connected to the anode of power tube $V_1$, while the anode of tube $V_2$ is connected to the negative terminal of the power source $E_{B2}$. The positive terminals of power sources $E_{B1}$ and $E_{B2}$ are joined together, as illustrated. Between the cathode $k_2$ and control electrode $g_2$ of the inverse power control tube a control voltage variation of waveform $e_{g2}$ is applied.

The D.-C. power supplied to the circuit, or, in other words, the product $E_{B1} \cdot I_{b1}$, is converted into useful A.-C. power by the power tube $V_1$. The efficiency of this conversion may, for example, be approximately 70%. The useful A.-C. power $$I_{B_2} \cdot L \frac{di_1}{dt}$$

is stored in the inductance $L_H$, in which, for instance, there is built up positive magnetic field energy by means of the current $i_1$. When this magnetic field, and consequently the cathode-ray beam deflection, has reached a desired amplitude, the power tube current is cut off. The instant of cut-off is denoted by the reference character A in the grid voltage waveforms $e_{g1}$ and $e_{g2}$ of Fig. 1, and also by the same reference character A in the current and voltage waveforms of Fig. 2.

There is now initiated a period of energy reversal (the beam retrace occurs in this period) in the tuned plate circuit $L_HC$. The magnetic field collapses, inducing a current $(+i)$ which charges capacitance C. This charge reaches a maximum when the current $i=0$ (Fig. 2).

The potential energy in condenser C is now released in the form of a condenser discharge current $(-i)$ which flows through the circuit in reverse direction. This current builds up a "negative" magnetic field in the deflecting coil $L_H$. Current and field maxima are again reached at an instant designated by the reference character B in the waveforms of Figs. 1 and 2, these maxima being in the order of, say, 60 to 80% of the original values at the instant A because some power loss takes place in tuned circuits with finite Q values.

Having completed one cycle of energy reversal —that is, one-half cycle of free oscillation, the circuit is shunted by the inverse power control tube $V_2$, which now receives a positive plate potential. The tube $V_2$ is selected to have a low plate resistance $(r_{p_2})$ so that the effect of capacity C is negligible, and the discharge circuit consists, for practical purposes of the coil $L_H$, its resistance R, and the tube V having the low plate resistance $r_{p_2}$, over the battery $E_{B_2}$.

The magnetic field and current $i_2$ in the coil $L_H$ are now forced to decrease in a desired manner by control of the internal plate resistance $r_{p_2}$ of tube $V_2$ through application of a control voltage variation of waveform $e_{g_2}$ between the cathode $k_2$ and control electrode $g_2$ of the tube $V_2$. Tube $V_2$ accordingly acts in effect as a rectifier. Since power is simultaneously supplied (at instant B) by the restarted current of tube $V_1$ due to its control grid voltage $e_{g_1}$, the combined currents of tubes $V_1$ and $V_2$ result in a linearly varying total current $i_s$ (Fig. 2), the resultant linear change in the magnetic field causing the desired deflection, during scansion of the electron beam developed within the cathode ray tube (not shown) about the neck of which the deflecting coil $L_H$ is supported.

Triode $V_2$ has a low internal voltage drop and hence must be loaded by an external D.-C. load to absorb the power released from the circuit, since the sum of circuit resistance voltage drop, tube voltage drop, and load voltage equals the inductive voltage $$L\frac{di_s}{dt}$$

The output power may be dissipated in a bypassed resistor, or it may be used to charge a battery of voltage $E_{B_2}$ the charging current being the average released current $I_{b_2}$. The power output $E_{B_2}\cdot I_{b_2}$ is obviously the difference between the power input $$I_{b_1}\cdot L\frac{di_s}{dt}$$

and the circuit and tube loss in $V_2$.

In accordance with the present invention, I provide for the recirculation of this power output $E_{B_2}\cdot I_{b_2}$. The principle underlying one embodiment of the invention is set forth in Figs. 3 and 4, these figures being based upon the typical circuit of Fig. 1, and Fig. 4 illustrating one manner in which the output power may be fed back in series with the power source so as to increase the plate voltage on the power tube.

When the output power is fed back in series with the power source, the average currents $I_{b_1}$ and $I_{b_2}$ of tubes $V_1$ and $V_2$, respectively, must be equal. To compensate for circuit losses, a voltage step-down ratio is, therefore, required from tube $V_1$ to tube $V_2$. This is provided for in Figs. 3 and 4 by transformer *Tr* having an adjustable tap $N_T$.

Figure 2:
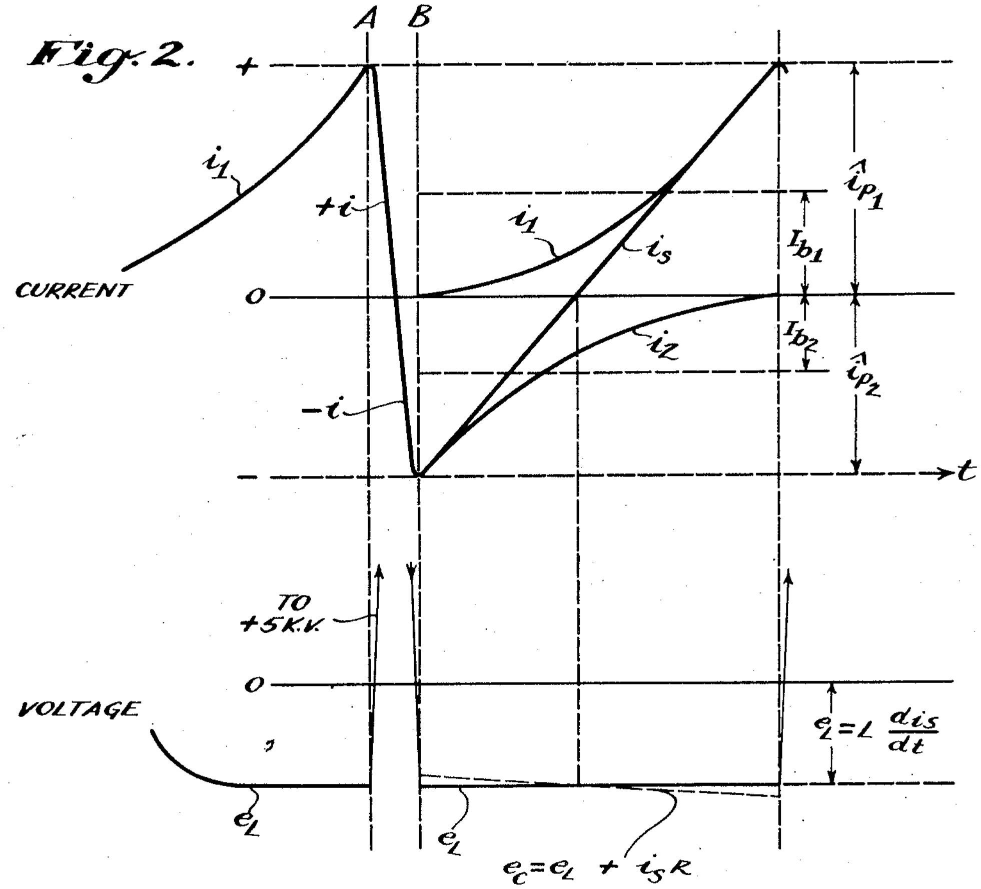
Fig. 2 is a graph useful in describing the operation of the circuit of Fig. 1.
Figure 3:
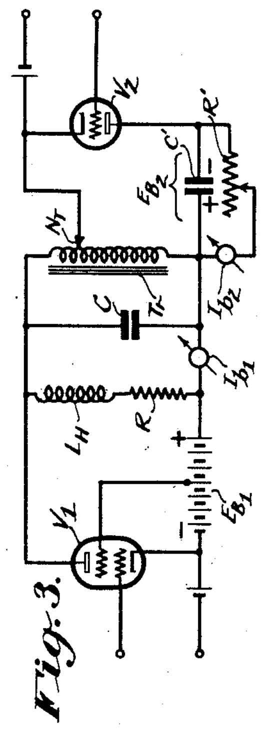
Fig. 3 is a diagram introductory to Fig. 4.
Figure 4:
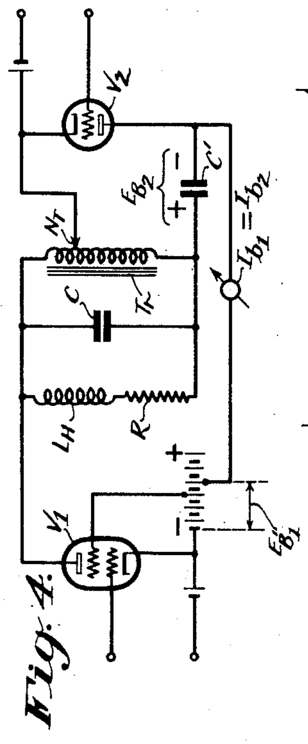
Fig. 4 shows one manner in which the present invention may be incorporated with the circuit of Fig. 1.

The average currents $I_{b_1}$ and $I_{b_2}$ in a typical scanning circuit without feedback, such as shown in Figs. 1 and 3, are determined by the turns ratio of the transformer (if any) as well as the operating conditions of both the power tube and inverse power control tube. Normal current waveforms obtained with unity ratio (the transformerless circuit of Fig. 1 may be assumed to have a 1:1 ratio) and proper control voltages $e_{g_1}$ and $e_{g_2}$ are illustrated in Fig. 2 for class A operation of tubes $V_1$ and $V_2$. The power loss in the tuned circuit $L_HC$ during retrace will cause currents $i_{p_1} > i_{p_2}$, and, as good efficiency requires that current $i_{p_2}$ decrease to zero at the end of the beam scanning interval, it follows that the ratio of the average currents will be $$\frac{I_{b_1}}{I_{b_2}} > 1$$

This current ratio may be decreased to unity by the use of a transformer turns ratio $$\frac{N_1}{N_2}$$

equal to the actual average current ratio in the circuit with unity turns ratio.

Adjustment of the transformer ratio in a series circuit is in fact a linearity adjustment and may be determined empirically. In Fig. 3, which illustrates a system based upon the typical scanning circuit of Fig. 1, inverse power control tube $V_2$ is loaded with a parallel combination of condenser C′ and resistor R′. Current $I_{b_2}$ develops a voltage $E_{B_2}$ on condenser C′. The turns ratio of transformer *Tr* is adjusted by varying tap $N_T$ so that $$\frac{I_{b_1}}{I_{b_2}} = 1$$

with linear deflection of the cathode-ray beam. The resistor R′ is then removed, as shown in Fig. 4, and the terminals of condenser C′ connected in series with battery $E_{B_1}$, which is reduced to a voltage $E_{B'_1}$ such that $E_{B'_1} + E_{B_2} = E_{B_1}$. Thus Fig. 3, which does not serve to enhance the power supply, aids in arriving at Fig. 4 which has such effect in accordance with the present invention.

Figure 5:
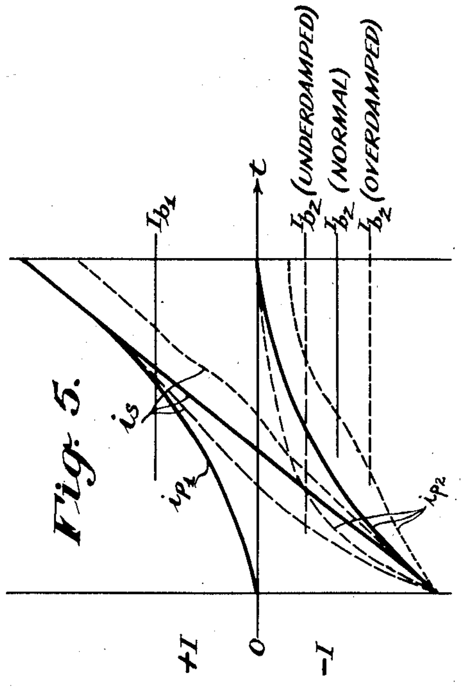
Figs. 5, 6 and 7 are graphs illustrating various operating conditions of the circuit of Fig. 4.

Fig. 5 illustrates the effect of improper adjustment of the ratio of the average currents $I_{b_1}$ and $I_{b_2}$. Consider first the condition when current $I_{b_2} < I_{b_1}$ when adjusted for linearity of deflection, as would occur when the circuit of Fig. 3 has a smaller step-down transformer turns ratio $$\frac{N_1}{N_2}$$

Upon series connection of $E_{B_1}$ and $E_{B_2}$ as shown in Fig. 4, only the power tube current $I_{b_1}$ is possible, forcing current $I_{b_2}$ to increase and equal current $I_{b_1}$. This condition also exists before series connection of $E_{B_1}$ and $E_{B_2}$ when resistor R′ in Fig. 3 is decreased in value, and hence gives the "overdamped" operation illustrated in Fig. 5.

On the other hand, if current $I_{b_2} > I_{b_1}$ when linearity of deflection is obtained in the circuit of Fig. 3 due to a larger transformer step-down turns ratio $$\frac{N_1}{N_2}$$

then series connection of $E_{B_1}$ and $E_{B_2}$ as shown in Fig. 4 will give the "underdamped" operation illustrated in Fig. 5. This operating condition may also be obtained from the circuit of Fig. 3 by increasing the value of resistor R′ so that current $I_{b_2}$ decreases to equal current $I_{b_1}$.

If the transformer turns ratio $$\frac{N_1}{N_2}$$

is substantially correct, small beam deflection linearity errors may be compensated for by adjustment of the control grid voltage $e_{g_2}$ on the inverse power control tube $V_2$.

Figure 6:
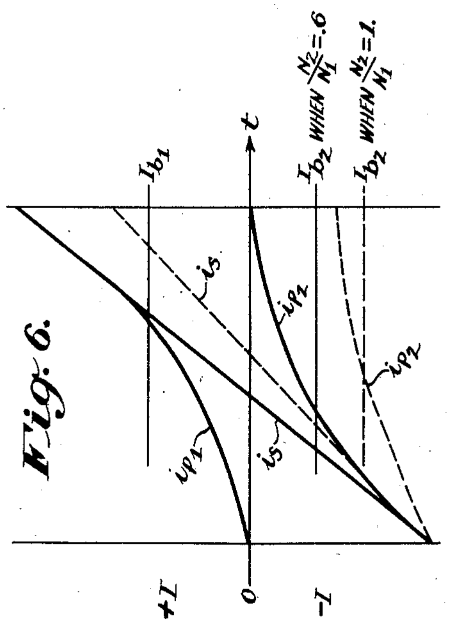

Fig. 6 shows the current waveforms required for linearity of deflection as reflected into the plate circuit of tube $V_1$ as a function of the transformer turns ratio. The peak currents $$\hat{\imath}_1 \text{ and } \hat{\imath}_2$$

have fixed values determined by the circuit "Q." The reflected average current appears multiplied by the transformer turns ratio $$\frac{N_2}{N_1}$$

and current $i_{p_2}$ appears as a family of curves with decreasing current changes and requiring less control grid signal on tube $V_2$ as the ratio $$\frac{N_2}{N_1}$$

increases. Correction of deflection linearity is possible by this means only when the ratio $$\frac{N_2}{N_1}$$

is larger than the optimum ratio for which current $i_{p_2}$ reaches zero at the end of the beam scanning interval. The amplitude loss in the resultant current $i_s$, as shown in Fig. 6, is considerable for large departures from the optimum turns ratio and should be avoided.

Figure 7:
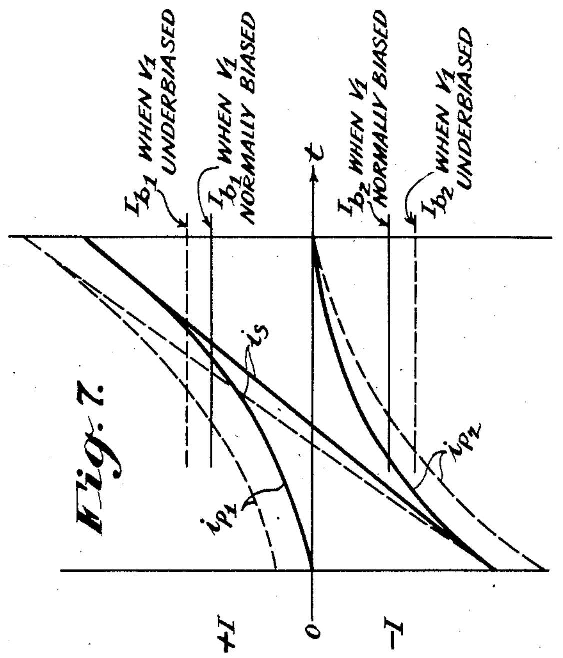

It may appear that a change of average current $I_{b_1}$ by underbiasing of the power tube $V_1$ produces linearity changes. This is not the case, as illustrated in Fig. 7. The peak current ratio $$\hat{\imath}_{p_1}/\hat{\imath}_{p_2}$$

remains fixed, and consequently the current $I_{b_2}$ also has a larger value. However, the result is different when the average current $I_{b_1}$ is altered by a change in the waveform of current $i_{p_1}$, since the peak currents may have the same values for different values of the average current $I_{b_1}$. Such changes in current waveform are obtainable intentionally by making substantial changes in the waveform of the grid signal $e_{g_1}$ on tube $V_1$ through variations in the ratio of the peak voltages applied to the grid $g_1$ during the beam scanning and retrace intervals, or unintentionally due to plate characteristic variations of tube $V_1$ in the "knee" region.

The series connection of $E_{B_1}$ and $E_{B_2}$ as shown in Fig. 4 forces a common average current $I_{b_1}=I_{b_2}$ under all operating conditions. The step-down turns ratio of transformer $Tr$ depends on circuit losses, and varies between the values $$\frac{N_1}{N_2}=1.5 \text{ to } 2$$

in practical circuits.

Figure 8:
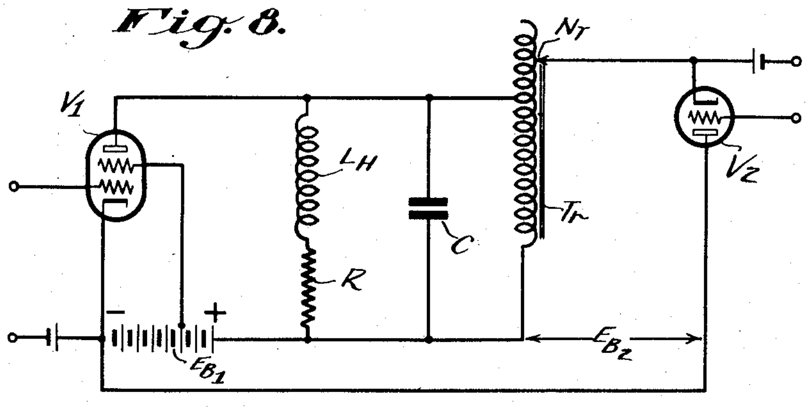
Fig. 8 shows another manner in which the present invention may be incorporated with the circuit of Fig. 1.

In Fig. 8 is shown an alternative arrangement based upon the circuit of Fig. 3, but in which the output power is fed back in parallel with the power source instead of in series therewith as shown in Fig. 4. This requires that the voltages $E_{B_1}=E_{B_2}$, rather than the currents $I_{b_1}=I_{b_2}$, as with series feedback. To compensate for losses, a voltage step-up transformer is required between tubes $V_1$ and $V_2$, as compared with a voltage step-down transformer in the circuit of Fig. 4. The parallel feedback system of Fig. 8, however, is often less desirable than the series feedback method such as shown in Fig. 4 due to the fact that a high component voltage is developed.

Figure 9:
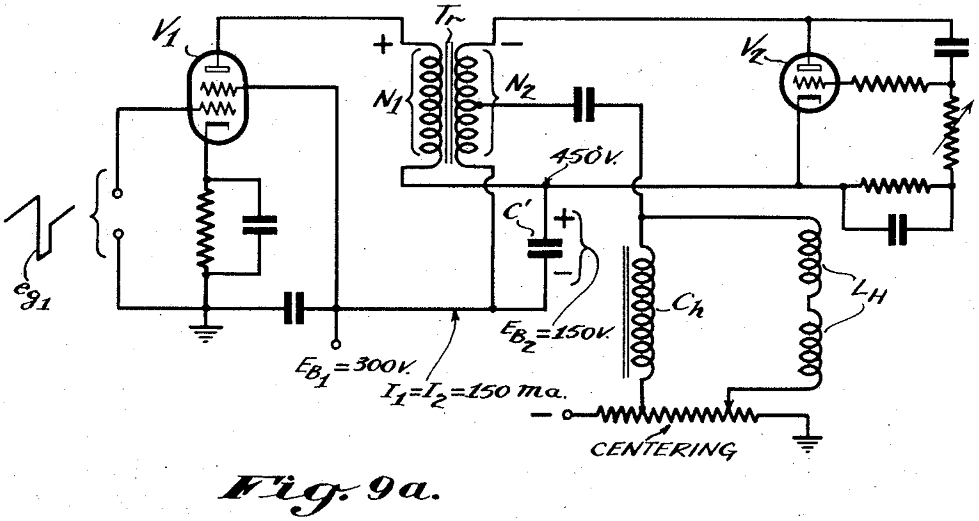
Fig. 9 illustrates schematically a commercially practical cathode-ray beam deflecting circuit embodying the present invention.

Fig. 9 shows one form of the present invention as applied to a commercially practical circuit which provides substantially constant linearity over a wide range of deflection amplitudes with only minor corrections. In this arrangement the horizontal deflection doils $L_H$ are impedance coupled to the transformer $Tr$, which, it may be assumed for illustration purposes, has $N_1=600$ turns and $N_2=360$ turns, by means of a choke $Ch$ for operation with the normal centering circuit at ground potential. If $V_1$ (shown for the purpose of illustration as a single tube) consists of two tubes (such, for example, as those known as the type 807) in parallel, and $V_2$ consists of a tube such, for example, as that known as the type A–4390, then a supply voltage $E_{B_1}$ of 300 volts can be made to develop at an operating frequency of 30 kilocycles a voltage $E_{B_2}$ on condenser C′ of 150 volts when an average current $I_1=I_2=150$ milliamperes is flowing in the circuit.

It will be apparent that the power recovered in the secondary circuit is, therefore, $$150 \text{ volts} \times .15 \text{ ampere} = 22.5 \text{ watts}$$

This is fed back in series with the supply voltage $E_{B_1}=300$ volts to the power tube $V_1$, which consequently operates with the plate power $$(E_{B_1}+E_{B_2})\cdot(I_1=I_2)= 450 \text{ volts} \times .15 \text{ ampere} = 67.5 \text{ watts}$$

However, the power supplied to the circuit is $E_{B_1}\cdot I_1=300$ volts$\times$.15 ampere=45 watts, which means that 67.5 watts−45 watts=22.5 watts are circulating in the circuit.

Other amounts of reclaimed power will be obtained for different circuit component values and operating frequencies. The power figures given above are merely intended to represent those obtained under one possible set of operating conditions. The voltage gain is proportional to the overall efficiency. An efficiency of 50% permits a 50% reduction in the B-supply voltage; a 20% efficiency permits a 20% reduction, etc. The tube efficiencies increase with the inductive load voltage giving, therefore, increased voltage gains for higher inductances and scanning frequencies.

At low frequencies the rectifier tube $V_2$ consumes power from the supply $E_{B_1}$, as the inductive voltage is lower than the tube voltage drop, causing $E_{B_2}$ to become negative. At high scanning frequencies, the inductive voltage is large, and $E_{B_2}$ becomes positive, thus filling automatically the requirement for increased plate supply voltage on tube $V_1$. This action protects the power tube $V_1$ against excessive plate dissipation upon removal of the grid signal $e_{g_1}$ when operating at high scanning frequencies.

It will be noted that the load resistor R′ of Fig. 3 has been replaced in Figs. 4 and 9 by the impedance of the power tube $V_1$. The load is hence a 3/2 power law function and not a fixed value such as resistor R′ in Fig. 3. This causes the scanning beam deflection current to remain linear, once it is adjusted, regardless of changes in the input voltage $e_{g_1}$. This is not true in circuits of the type shown in Figs. 1 and 3 where the battery voltage $E_{B_2}$ or the resistance R′ respectively must be readjusted upon signal voltage changes.

In the operation of the circuit shown by Fig. 9 it has been possible in practice to vary the B-supply $E_{B_1}$ from 120 volts to 350 volts without change in the sawtooth waveform of the current in the deflecting coils $L_H$. Likewise, it has also been found that the grid signal voltage $e_{g_1}$ on the two 807 power tubes may be varied over a ratio of 10:1 without any detrimental effect on the linearity of deflection of the cathode-ray beam.

Figure 9A:
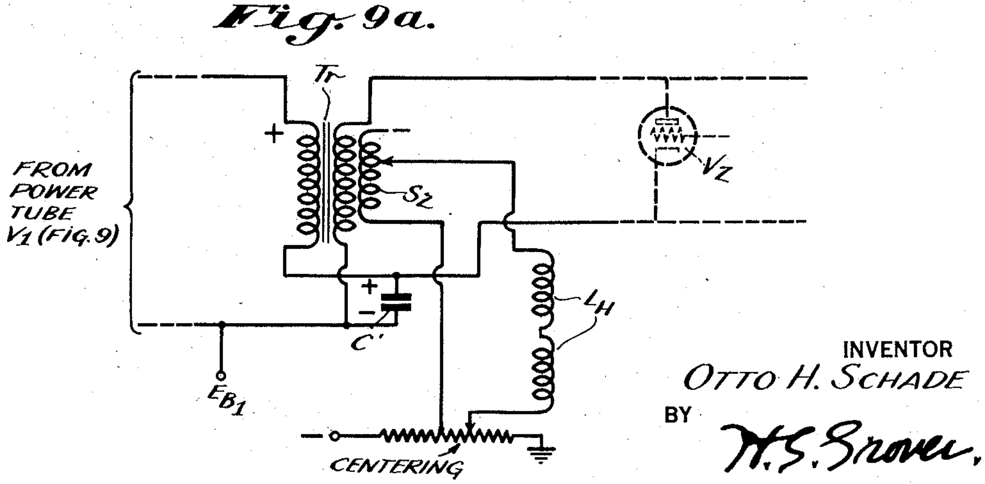
Fig. 9a shows a modification of the circuit of Fig. 9.

In Fig. 9 the deflecting coils $L_H$ are coupled to the transformer $Tr$ by means of the choke $Ch$. An alternative coupling method is shown in Fig. 9a, in which the $Ch$ is replaced by an additional winding $S_2$ on transformer $Tr$. This tends to increase the circuit efficiency, since some power loss is caused by the iron core of the choke $Ch$. In order to obtain tight coupling and eliminate leakage reactance, the winding $S_2$ is preferably wound in parallel with the winding of the inverter tube $V_2$, that is, two wires at the same time. Also, the winding $S_2$ may be provided with an adjustable tap, as shown, when a lower deflection coil inductance is required, due, for example, to coil or cable capacitances.

It will be understood that the principle of the present invention is not restricted to cathode-ray beam scanning circuits, but is applicable to any circuit possessing cyclic reactive energy. It will also be clear that all or part of the reclaimed power may be used for purposes other than that shown.

Other modifications, of course, will be obvious to those skilled in the art to which the invention is directed.

Having now described the invention, what is claimed and desired to be secured by Letters Patent is the following:

1. In a deflection system a source of D.-C. power, an electron discharge device connected to said source of D.-C. power for converting the D.-C. power into A.-C. power through a damping path and a power delivery path, the A.-C. power having a sawtooth wave form with a scanning trace and a return trace, a deflection yoke connected to said electron discharge device into which the A.-C. power output of said electron discharge device is fed, a unilaterally conducting unit connected to said deflection yoke for rectifying the reactive energy cyclically developed in said deflection yoke, connections between the converting means and the unilaterally conducting unit including a transforming means having such a stepdown turns ratio as to produce substantially equal average currents through the electron discharge device and the unilateral device respectively and to produce substantially maximum linearity of deflection of the scanning trace, an energy-storage device, means for applying the rectified energy to said energy-storage device so as to develop a substantially smooth D.-C. potential thereon having a value dependent upon the amplitude of the rectified energy, and a circuit for applying the D.-C. potential developed on said energy-storage device to said electron discharge device to increase the A.-C. power output thereof.

2. In a system having reclaimable energy losses, a combination of a source of D.-C. power, means for converting the D.-C. power supplied by said source into A.-C. power having a sawtooth wave form with a scanning trace and a return trace, an inductively reactive load circuit connected to said aforementioned means, means for rectifying the reactive energy cyclically developed in said load circuit, connections between the load circuit and the rectifying means including an autotransformer having such a stepdown turns ratio as to produce substantially maximum linearity of deflection of the scanning trace, an energy-storage device connected to said rectifying means, means for applying the rectified energy to said energy-storage device so as to establish a substantially smooth D.-C. potential thereon having a value dependent upon the amplitude of the rectified energy, and a circuit connecting said storage device and said source of D.-C. power for applying the D.-C. potential established on said energy-storage device to said converting means additively in series with said source.

3. In a system having reclaimable energy losses, the combination of a source of D.-C. power, means for converting the D.-C. power supplied by said source into A.-C. power, an inductively reactive load circuit connected to said aforementioned means, a rectifier for rectifying the reactive energy cyclically developed in said load circuit, an energy-storage device connected to said rectifying means, means for applying the rectified energy to said energy-storage device so as to establish a substantially smooth D.-C. potential thereon having a value dependent upon the amplitude of the rectified energy, and a circuit connecting said storage device and said source of D.-C. power for applying the D.-C. potential established on said energy-storage device to said converting means in parallel with said source so as to increase the amount of A.-C. power fed to said load circuit.

4. In a deflection system having reclaimable energy losses and including a source of D.-C. power, means connected to said source of D.-C. power through a damping path and a power delivery path for converting the D.-C. power supplied by said source into A.-C. power having a sawtooth wave form with a scanning trace and a return trace, a deflection coil consisting of an inductively reactive load circuit for said converting means into which the A.-C. power output of said converting mean is fed, a rectifier connected to said converting means for rectifying the reactive energy cyclically developed in said load circuit, the connection between the converting means and the rectifier including a transformer having such a stepdown turns ratio as to produce at least approximately equal average currents through the converting means and the rectifier respectively and to produce substantially maximum linearity of deflection of the scanning trace, an energy-storage device connected to said rectifier, and a circuit for applying the D.-C. potential established on said energy-storage device to said converting means through said power delivery path.

5. In a system having reclaimable energy losses and including a source of D.-C. power, means connected to said source of D.-C. power through an uninterrupted D.-C. path for converting the D.-C. power supplied by said source into A.-C. power having a sawtooth wave form with a scanning trace and a return trace, and an inductively reactive load circuit into which the A.-C. power output of said converting means is fed, the combination of means for rectifying the reactive energy cyclically developed in said load circuit, an energy-storage device, connections between the load circuit and the rectifying means including a transformer having such a stepdown ratio as to produce substantially equal average currents through the converting means and the rectifying means respectively and to produce substantially maximum linearity of deflection of the scanning trace, means for applying the rectified energy to said energy-storage device so as to establish a substantially smooth D.-C. potential thereon having a value dependent upon the magnitude of the rectified energy, and a circuit connected in the continuous uninterrupted path for applying the D.-C. potential established on said energy-storage device to said converting means additively in series with said source and said power converting means.

6. In a system having reclaimable energy losses and including a source of D.-C. power, means for converting the D.-C. power supplied by said source into A.-C. power, and an inductively reactive load circuit into which the A.-C. power output of said converting means is fed, the combination of means for rectifying the reactive energy cyclically developed in said load circuit, an energy-storage device, means for applying the rectified energy to said energy-storage device so as to establish a substantially smooth D.-C. potential thereon having a value dependent upon the magnitude of the rectified energy, and a circuit for applying the D.-C. potential established on said energy-storage device to said converting means in parallel with said source so as to increase the A.-C. power output of said converting means.

7. A cathode ray beam deflection system comprising a source of D.-C. power, an A.-C. generator connected to said source for generating A.-C. power having a sawtooth wave form with a scanning trace and a return trace, a deflection coil consisting of an inductively reactive load circuit to said generator, means for reclaiming a portion of the power normally lost in said load circuit, said means including a rectifier connected to said load circuit to rectify the reactive energy cyclically developed in said load circuit, the connection between the load circuit and the rectifier including a transformer having such a stepdown ratio as to produce substantially equal average currents through the A.-C. generator and the rectifier respectively and to produce substantially maximum linearity of deflection of the scanning trace, means connected to said rectifier for storing the rectified energy to develop a substantially smooth D.-C. potential, and said storing means connected in said D.-C. power source for applying said D.-C. potential to increase the amount of A.-C. power available for application to said load circuit.

8. Apparatus for recovering a portion of the reclaimable power normally lost in a cathode ray beam deflection system in which D.-C. power from a source of normally constant value is converted into A.-C. power for application to an inductively reactive load circuit consisting of a deflection coil the A.-C. power having a sawtooth wave form with a scanning trace and a return trace, said apparatus including a rectifier connected to a load circuit to rectify the reactive energy cyclically developed in said load circuit, the connection between the load circuit and the rectifier including a transformer having such a stepdown ratio as to produce substantially maximum linearity of deflection of the scanning trace, means connected to said rectifier for storing the rectified energy to develop a substantially smooth D.-C. potential having a value dependent upon the value of the rectified energy, and a circuit connected in said D.-C. power source for applying said D.-C. potential to permit a decrease in the normally constant D.-C. power output of said source, while maintaining the amount of A.-C. power available for application to said load circuit.

9. In combination in a system having reclaimable energy losses: a source of D.-C. power; means connected to said source for converting D.-C. power from said source into A.-C. power, said means including a power amplifier vacuum tube; a load circuit connected to said latter converting means, said load circuit including an inductive member having distributed capacity; a rectifier connected across said inductive member; an otherwise unbypassed energy-storage device connected in series with said inductive member and said rectifier; and a direct current connection between said source of D.-C. power and the junction between said rectifier and said energy-storage device.

10. In combination in a system having reclaimable losses: a source of D.-C. power; means for converting D.-C. power from said source into A.-C. power; a load circuit into which A.-C. power from said converting means is fed, said load circuit including an inductive member having distributed capacity; a rectifier connected across said inductive member; an energy-storage device connected in series with said inductive member and said rectifier; and a circuit for applying the energy stored by said energy-storage device to said converting means in parallel with said D.-C. source so as to increase the A.-C. power output of said converting means.

11. The combination of claim 9, further including a voltage step-down transformer connected between said inductive member and said rectifier.

12. The combination of claim 10, further including a voltage step-up transformer connected between said inductive member and said rectifier.

13. The combination of claim 9, in which said rectifier comprises an electron discharge device having a control electrode, further including means for applying a voltage variation to said control electrode so as to vary the impedance of said electron discharge device approximately in a predetermined manner.

14. In a cathode-ray beam deflecting circuit: a source of D.-C. power; means for converting D.-C. power from said source into A.-C. power of a substantially predetermined frequency, said means including a power amplifier vacuum tube; a cathode-ray beam deflecting coil connected to receive the power output of said converting means; a rectifier connected across said cathode-ray beam deflecting coil; an energy-storage device connected in series with said cathode-ray beam deflecting coil and said rectifier; and a circuit for connecting said energy-storage device to said converting means in arithmetically additive relationship with said D.-C. source.

15. In a cathode-ray beam deflecting circuit: a source of D.-C. power; means for converting D.-C. power from said source into A.-C. power of a substantially predetermined frequency; a cathode-ray beam deflecting coil connected to receive the power output of said converting means; a rectifier connected across said cathode-ray beam deflecting coil; an energy-storage device connected in series with said cathode-ray beam deflecting coil and said rectifier; and a circuit for connecting said energy-storage device to said converting means in parallel with said D.-C. source so as to increase the A.-C. power output of said converting means.

16. In a cathode-ray beam deflecting circuit: a source of D.-C. power; means for converting D.-C. power from said source into A.-C. power of a substantially predetermined frequency; a cathode-ray beam deflecting coil connected to receive the power output of said converting means; a transformer; a rectifier; means for coupling said deflecting coil across said rectifier through said transformer so that a voltage step-up ratio exists between said deflecting coil and said rectifier; an energy-storage member connected in series with said transformer and said rectifier; and a circuit for connecting said energy-storage member to said converting means in parallel with said D.-C. source so as to increase the A.-C. power output of said converting means.

17. In a cathode-ray beam deflecting circuit: a source of D.-C. power; means for converting D.-C. power from said source into A.-C. power of a substantially predetermined frequency and of sawtooth wave form including a scanning trace and a return trace; a cathode-ray beam deflecting coil connected to receive the power output of said converting means; a transformer; a rectifier; means for coupling said deflecting coil across said rectifier through said transformer so that a voltage step-down ratio exists between said deflecting coil and said rectifier such as to produce substantially maximum linearity of deflection during the scanning trace; an energy-storage member connected in series with said transformer and said rectifier; and a circuit for connecting said energy-storage member to said converting means additively in series with said D.-C. source.

18. The combination of claim 17 in which said rectifier comprises an electron discharge device having a control electrode, further including means for applying a voltage variation of predetermined waveform to the control electrode of said electron discharge device so as to vary the impedance thereof.

19. In a cathode-ray beam deflecting circuit: a power tube; a source of D.-C. power therefor; a source of synchronizing voltage; means for applying a synchronizing voltage from said source to said power tube so as to produce a cyclically varying power output therefrom; a cathode-ray beam deflecting coil connected to receive the output of said power tube; a controlled rectifier tube; a transformer having its primary winding connected across said cathode-ray beam deflecting coil and its secondary winding connected across said controlled rectifier tube; an energy-storage device connected in series with said controlled rectifier tube and the secondary winding of said transformer; and a circuit for connecting said energy-storage device to said power tube additively in series with said D.-C. power source.

20. In a cathode-ray beam deflecting circuit: a power tube; a source of D.-C. power therefor; a source of synchronizing voltage; means for applying a synchronizing voltage from said source to said power tube so as to produce a cyclically varying power output therefrom; a cathode-ray beam deflecting coil connected to receive the output of said power tube; a controlled rectifier tube; a transformer having its primary winding connected across said cathode-ray beam deflecting coil and its secondary winding connected across said controlled rectifier tube; an energy-storage device connected in series with said controlled rectifier tube and the secondary winding of said transformer; and a circuit for connecting said energy-storage device to said power tube in parallel with said D.-C. source so as to increase the output of said power tube.

21. A cathode-ray beam deflecting circuit as set forth in claim 19, further including means for adjusting the turns ratio of said transformer so that $$I_{b_1}=I_{b_2}$$

where $I_{b_1}$ is the average current flowing in the plate circuit of the power tube, and $I_{b_2}$ is the average current flowing in the rectifier tube circuit.

22. A cathode-ray beam deflecting circuit as set forth in claim 20, further including means for adjusting the turns ratio of said transformer so that $$E_{B_1}=E_{B_2}$$

where $E_{B_1}$ is the potential of the said D.-C. power source, and $E_{B_2}$ is the potential developed on said energy-storage device.

23. In a system having reclaimable energy losses and including a source of D.-C. power, means for converting the D.-C. power supplied by said source into A.-C. power having a sawtooth wave form with a scanning trace and a return trace, and a reactive load circuit into which the A.-C. power output of said converting means is fed, the combination of an electron discharge tube having at least two elements connected to rectify the reactive energy cyclically developed in said load circuit, connections between the converting means and the rectifying electron discharge tube including a transformer having such a stepdown turns ratio as to produce at least approximately equal average currents through the converting means and the electron discharge device respectively and to produce substantially maximum linearity of deflection of the scanning trace, a condenser, means for applying the rectified energy to said condenser so as to establish a substantially smooth D.-C. potential thereon having a value dependent upon the magnitude of the rectified energy, and means for applying the D.-C. potential established on said condenser to said converting means additively in series with said source of D.-C. power so as to increase the amount of A.-C. power available for application to said load circuit.

24. In a cathode-ray beam deflecting circuit having reclaimable energy losses, the combination of a source of D.-C. power, means for converting the D.-C. power from said source into A.-C. power of a substantially predetermined frequency and having a sawtooth wave form with a scanning trace and a return trace, a cathode-ray beam deflecting coil connected to receive the power output of said converting means, a tube having a cathode and an anode, an energy-storage device in the form of a condenser in series with said tube, means for connecting the series combination of said tube and said condenser across said cathode-ray beam deflecting coil so that said tube will rectify the reactive energy developed in said circuit, and said connecting means including an autotransformer having a turns ratio such as to produce substantially maximum linearity during the scanning trace, and means for connecting said energy-storage device to said converting means additively in series with said D.-C. source.

25. A high-efficiency deflection circuit for a cathode-ray tube having an associated deflecting coil for producing an electromagnetic deflecting field which comprises means including an electronic tube having an output circuit for supplying periodic sweep currents during sweep intervals, said periodic sweep currents alternating with retrace currents during relatively shorter retrace intervals, a transformer having a primary connected in said output circuit and a secondary connected to said deflecting coil, an economizer winding closely coupled with said secondary, rectifying means in series with said economizer winding and connected to pass current during at least portions of said sweep intervals and to become substantially nonconductive during said retrace intervals, otherwise unbypassed storage capacitor means connected in series with the rectifying means and the economizer winding to receive at least a portion of the rectified current and develop a corresponding direct voltage, and means for applying said direct voltage to said electronic tube.

26. A high-efficiency deflection circuit for a cathode-ray tube having an associated deflecting coil for producing an electro-magnetic deflecting field which comprises a sweep generator including an electronic tube having an anode output circuit for supplying periodic sweep currents during sweep intervals, said periodic sweep currents alternating with retrace currents during relatively shorter retrace intervals, a transformer having a primary connected in said output circuit and a secondary connected to said deflecting coil, an anode power supply for said electronic tube connected in series with said primary, an efficiency winding closely coupled with said secondary, a rectifier having anode and cathode, said efficiency winding being connected between said anode power supply and the anode of the rectifier with polarity selected to render the rectifier conductive during sweep intervals and substantially non-conductive during retrace intervals, a storage capacitor supplied from the cathode of said rectifier to store at least a portion of the rectified current and develop a corresponding direct voltage, and connections for supplying said direct voltage to said anode output circuit in series with said anode power supply.

27. A high-efficiency deflection circuit for a cathode-ray tube having an associated deflecting coil for producing an electromagnetic deflecting field which comprises a sweep generator including an electronic tube having an anode output circuit for supplying periodic sweep currents during sweep intervals, said periodic sweep currents alternating with retrace currents during relatively shorter retrace intervals, a transformer having a primary connected in said output circuit and a secondary connected to said deflecting coil, an anode power supply connected to supply anode voltage to said tube through the primary winding, a capacitor connected between said primary and said anode power supply, an efficiency winding closely coupled with said secondary, a rectifier having anode and cathode, said efficiency winding being connected between said anode power supply and the anode of the rectifier with polarity selected to render the rectifier conductive during sweep intervals and substantially nonconductive during retrace intervals, and a circuit connecting the cathode of said rectifier and said capacitor to periodically charge said capacitor and develop a direct voltage thereacross to supplement the anode power supply to said tube.

28. In a television system employing a cathode-ray tube having an electromagnetic deflecting coil for high-frequency line deflection, a high-efficiency deflection circuit which comprises a sweep generator including an electronic tube having an anode output circuit for supplying substantially sawtooth current waves at line-scanning frequency, said sawtooth waves having retrace intervals substantially shorter than the sweep intervals thereof, a transformer having a primary in said output circuit and a secondary connected to supply sweep currents to said deflecting coil, an anode power supply connected to supply anode voltage to said tube through said primary, an efficiency winding closely coupled with said secondary, a rectifier connected in series with said efficiency winding with the polarity selected to pass current during at least portions of said sweep intervals and to become substantially nonconductive during retrace intervals, otherwise unbypassed storage capacitor means connected in series with the rectifier and the efficiency winding to receive at least a portion of the rectified current and develop a corresponding direct voltage, and circuit connections for supplying said direct voltage to said anode circuit to supplement said anode power supply.

29. In a television system employing a cathode-ray tube having an electromagnetic deflecting coil for high-frequency line deflection, a high-efficiency deflection circuit which comprises a sweep generator including an electronic tube having an anode output circuit for supplying substantially sawtooth current waves at line-scanning frequency, said sawtooth waves having retrace intervals substantially shorter than the sweep intervals thereof, a transformer having a primary in said output circuit and a secondary connected to supply sweep currents to said deflecting coil, an anode power supply connected to supply anode voltage to said tube through said primary, an efficiency winding closely coupled with said secondary, a rectifier having anode and cathode, said efficiency winding being connected between said anode power supply and the anode of the rectifier with polarity selected to render the rectifier conductive during sweep intervals and substantially nonconductive during retrace intervals, a storage capacitor supplied from the cathode of said rectifier to store at least a portion of the rectified current and develop a corresponding direct voltage, and circuit connections for supplying said direct voltage to said anode circuit to supplement said anode power supply.

OTTO H. SCHADE.

REFERENCES CITED

The following references are of record in the file of this patent:

UNITED STATES PATENTS

| Number | Name | Date |
|---|---|---|
| 2,074,495 | Vance | Mar. 23, 1937 |
| 2,212,217 | White | Aug. 20, 1940 |
| 2,278,431 | Klemperer | Apr. 7, 1942 |
| 2,382,822 | Schade | Aug. 14, 1945 |

FOREIGN PATENTS

| Number | Country | Date |
|---|---|---|
| 548,613 | Great Britain | Oct. 16, 1942 |